(12) United States Patent  (10) Patent No.: US 6,739,771 B2
Kawaoka  (45) Date of Patent: May 25, 2004

(54) PRINTING SYSTEM FOR PRINTING AT A USER SELECTED LOCATION

(75) Inventor: Yoshiki Kawaoka, Asaka (JP)

(73) Assignee: Fuji Photo Film Co., Ltd, Kanagawa (JP)

( * ) Notice: Subject to any disclaimer, the term of this patent is extended or adjusted under 35 U.S.C. 154(b) by 0 days.

(21) Appl. No.: 10/124,341

(22) Filed: Apr. 18, 2002

(65) Prior Publication Data

US 2002/0154930 A1 Oct. 24, 2002

(30) Foreign Application Priority Data

Apr. 19, 2001 (JP) ........................................ 2001-120732

(51) Int. Cl.[7] .............................................. B41J 11/44
(52) U.S. Cl. .............................. 400/61; 400/70; 400/76
(58) Field of Search ................................ 400/61, 70, 76

(56) References Cited

U.S. PATENT DOCUMENTS

2003/0083996 A1 * 5/2003 Fischer ........................ 705/52
2003/0088828 A1 * 5/2003 Ackaret ....................... 715/505

FOREIGN PATENT DOCUMENTS

| JP | 10191453 A | * | 7/1998 | ............ H04Q/7/38 |
| JP | 2002236637 A | * | 8/2002 | ............ G06F/13/00 |

OTHER PUBLICATIONS

Patent Application Publication US2001/0034747 A1 filed Feb. 22, 2001, published Oct. 25, 2001 to Fujitani et al.*

* cited by examiner

Primary Examiner—Charles H. Nolan, Jr.
(74) Attorney, Agent, or Firm—Birch, Stewart, Kolasch & Birch, LLP (57) ABSTRACT

A Web server is accessed using a cellular telephone. When desired digital content desired to be printed is found, the user designates a location at which this digital content is to be printed. The digital content is transmitted from the Web server to a printing terminal that has been installed at the designated location, and the printing terminal prints the digital content. The user goes to the designated location and picks up the printout. Even if the user is on the road, therefore, desired digital content that has been stored in the Web server can be printed out and received.

33 Claims, 9 Drawing Sheets

ORDER-INFORMATION FILE

PRINT ORDER :
IDENTIFICATION ID:
    09012345678
DIGITAL CONTENT :
    FILE001
SIZE : L
NUMBER OF PRINTS : 5

Fig. 8

LIST OF RECEIVING STORES
ABC CONVENIENCE STORE
    AOYAMA BRANCH
DEF CONVENIENCE STORE        /110
    AKASAKA BRANCH
        ⋮

PRINTING SYSTEM FOR PRINTING AT A USER SELECTED LOCATION

BACKGROUND OF THE INVENTION

1. Field of the Invention

This invention relates to a printing system, a portable electronic device constituting the printing system, a method of controlling the electronic device, a Web server constituting the printing system, and a method of controlling the Web server.

2. Description of the Related Art

A variety of digital content may be stored in a Web server. Digital content that has been stored in the Web server can be viewed using not only a personal computer but also a portable electronic device such as a cellular telephone.

Since a portable electronic device is comparatively easy to carry about, digital content that has been stored in the Web server can be viewed even when one is on the road. A device such as a printer, however, is not especially designed with portability in mind and not much thought has been given to using a printer to print digital content when one is on the road.

DISCLOSURE OF THE INVENTION

Accordingly, an object of the present invention is to so arrange it that digital content that has been stored in a Web server can be printed even when one is on the road.

According to an embodiment of the present invention, the foregoing object is attained by providing a printing system comprising a Web server storing digital content, a portable electronic device and a printing terminal that are capable of communicating with one another.

The portable electronic device includes a designating device for designating the number of prints and digital content, which has subject matter desired to be printed, from among the digital content that has been stored in the Web server; an input device for inputting information relating to a receiving location where a printout of the subject matter will be received; and a first transmitting device for transmitting an order-information file including data representing the number of prints and identification data, which identifies the digital content that has been designated by the designating device, and information relating to the receiving location input from the input device, to the Web server in a form associated with each other.

The Web server includes a retrieval device (retrieval means) for retrieving digital content, which has the subject matter desired to be printed, from the digital content that has been stored in the Web server, based upon the identification data transmitted from the first transmitting device of the portable electronic device; and a second transmitting device for transmitting the order-information file and digital content, which has been retrieved by the retrieval device, to the printing terminal placed at a location specified by information relating to the receiving location transmitted from the first transmitting device of the portable electronic device.

The printing terminal has a printer for printing subject matter represented by digital content that has been transmitted from the second transmitting device of the Web server, the number of prints represented by data of the number of prints.

The portable electronic device, Web server and printing terminal may each be constructed in stand-alone fashion.

A second embodiment of the present invention also provides an operation control method suited to the above-described portable electronic device. Specifically, the method comprises the steps of designating the number of prints and digital content, which has subject matter desired to be printed, from among digital content that has been stored in a Web server; inputting information relating to a receiving location where a printout of the subject matter will be received; and transmitting an order-information file including data representing the number of prints and identification data, which identifies the digital content that has been designated, and information relating to the receiving location that has been input, to the Web server in a form associated with each other.

Another embodiment of the present invention provides an operation control method suited to the above-described Web server. Specifically, the method comprises the steps of retrieving digital content, which has subject matter desired to be printed, from digital content that has been stored in the Web server, based upon identification data, which is included an order-information file, identifying the digital content, which has the subject matter desired to be printed, from among digital content that has been stored in the Web server, the identification data being transmitted from a portable electronic device; and transmitting the order-information file and digital content that has been retrieved to a printing terminal placed at a location specified by information relating to a receiving location transmitted from the portable electronic device.

According to yet another embodiment of the present invention, the portable electronic device is used to designate the number of prints and digital content, which has subject matter desired to be printed, from among digital content (image data and text data, etc.) that has been stored in the Web server. Information relating to a location for receiving prints is entered. (The location may be one that is uniquely determined, such as a specific store name, or a general designation (a plurality of locations) such as a convenience store, supermarket or station.) An order-information file including data representing the number of prints and identification data of the designated digital content, and the entered information relating to the receiving location are transmitted from the portable electronic device to the Web server in a form associated with each other.

Upon receiving the digital-content identification data included in the order-information file and the information relating to the receiving location transmitted from the portable electronic device, the Web server retrieves the digital content, which has been stored in the Web server, based upon the digital-content identification data. The order-information file and retrieved digital content is transmitted from the Web server to the printing terminal.

The printing terminal receives the digital content transmitted from the Web server and prints the subject matter represented by the received digital content, the number of prints represented by data of the number of prints.

By using a printing terminal placed at any of a variety of locations, the user of the portable electronic device can print digital content, which has been stored in the Web server, even if a printer is not readily available, as when the user is on the road.

The Web server may further include a generating device for generating an order ID in response to receipt of the digital-content identification data and information relating to the receiving location transmitted from the first transmitting device of the portable electronic device; and a third transmitting device for transmitting the order ID, which has been generated by the generating device, to the portable electronic device and printing terminal. Further, digital content retrieved by the retrieval device and identification data identifying the portable electronic device transmitted from the first transmitting device of the portable electronic device are transmitted, in a form associated with each other, to the printing terminal placed at a location specified by information relating to the receiving location.

In this case, the portable electronic device further includes a fourth transmitting device for transmitting the order ID, which has been transmitted from the third transmitting device of the Web server, to the printing terminal.

Furthermore, the printing terminal further includes a determination device (determination means) for determining whether the order ID transmitted from the third transmitting device of the Web server and the order ID transmitted from the fourth transmitting device of the portable electronic device match; and a device (means) for controlling the printer so as to execute printing in accordance with a determination by the determination device to the effect that the order IDs match.

It is determined whether the order IDs match. If they do not match, printing by the printer is inhibited. Thus, printing can be executed only when an authorized user requests printing.

As mentioned above, the information relating to the receiving location entered from the input device of the portable electronic device may indicate a receiving location that is decided uniquely.

Further, information relating to the receiving location entered from the input device of the portable electronic device may indicate a plurality of receiving locations. In this case, the Web server includes a generating device (generating means) for generating an order ID in response to receipt of the digital-content identification data and information relating to the receiving location transmitted from the first transmitting device of the portable electronic device; and a fifth transmitting device for transmitting the order ID, which has been generated by the generating device, to the portable electronic device and printing terminal.

The portable electronic device further includes a sixth transmitting device for transmitting the order ID, which has been transmitted from the fifth transmitting device of the Web server, to the printing terminal.

The printing terminal further includes a determination device (determination means) for determining whether the order ID transmitted from the sixth transmitting device of the portable electronic device and the order ID transmitted from the fifth transmitting device of the Web server match. The second transmitting device of the Web server would transmit the digital content to the printing terminal in accordance with a determination by the determination device to the effect that the order IDs match.

Thus, even if a plurality of locations are designated as receiving locations, a printout can be received at any location among the plurality of designated locations. For example, if a convenience store is merely designated as the receiving location, then a printout can be received at any convenience store on the road; it is not necessary to find a specific store. This arrangement is particularly useful when the user does not know where a printing terminal is located.

Other features and advantages of the invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
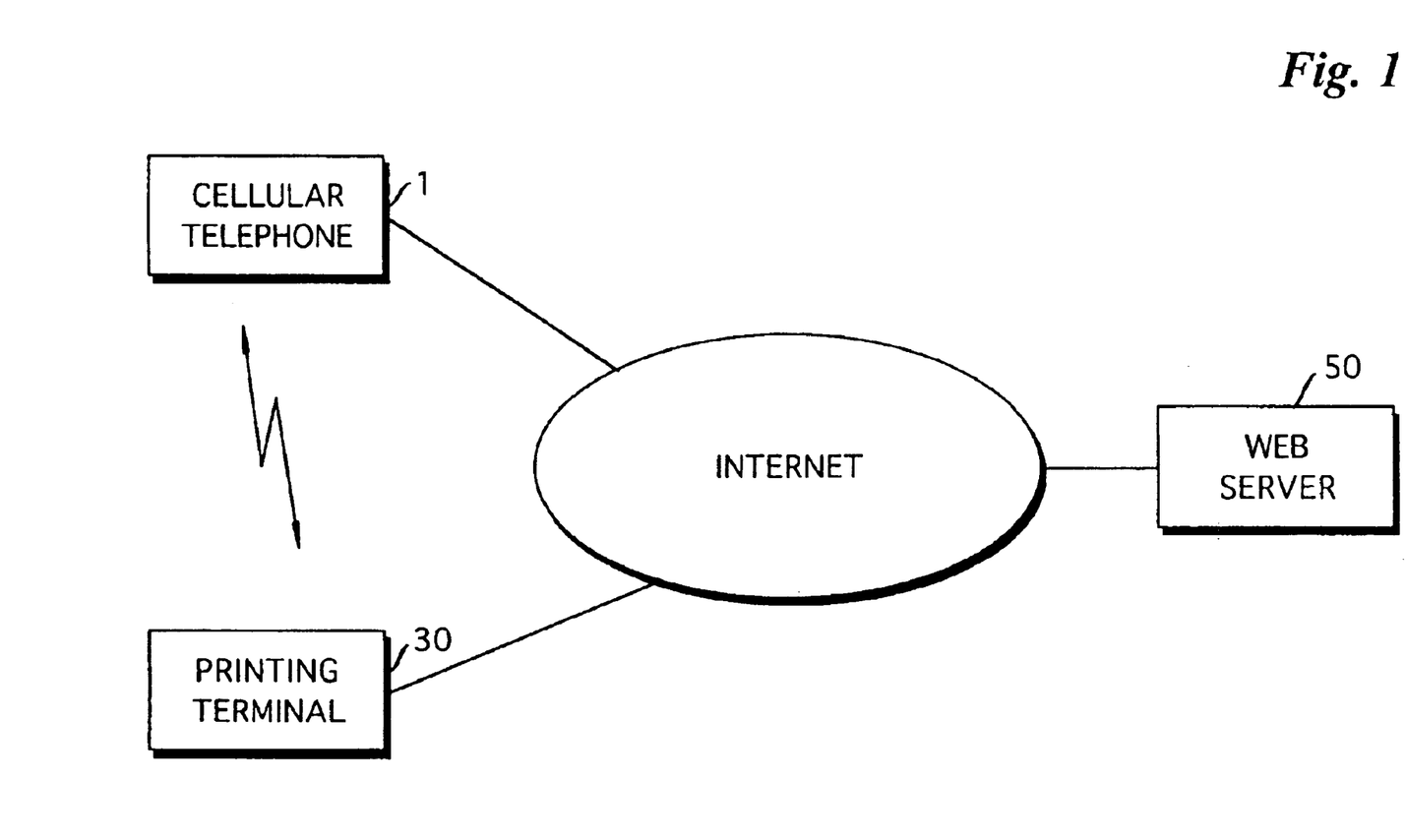
FIG. 1 is a diagram showing an overview of a printing system according to the present invention.

FIG. 1 illustrates an overview of a printing system according to an embodiment of the present invention.

The printing system comprises a cellular telephone 1, a printing terminal 30 and a Web server 50, which are capable of communicating with one another via the Internet. Though only one cellular telephone 1 and one printing terminal 30 are illustrated, it goes without saying that a number of each of these are provided. The cellular telephone 1 and printing terminal 30 can communicate with each other by a short-distance communication scheme such as Bluetooth.

The cellular telephone 1 is carried about by the user. The printing terminal 30 is disposed at a number of locations, such as convenience stores, department stores, stations and amusement parks, etc.

It goes without saying that the Web server 50 includes a CPU, a memory, a modem for connection to the Internet, a database storing digital content and a hard-disk drive.

In the printing system according to this embodiment, the Web server 50 is accessed by the cellular telephone 1 to decide the Web page that is to be printed. Data (digital content) representing the Web page or a part of the Web page that has been decided is transmitted from the Web server 50 to the printing terminal 30, which has been installed at a location that the user has designated. The user goes to the printing terminal 30 at the designated location and receives the printout provided by the printing terminal 30. This will be described below in greater detail.

Figure 2:
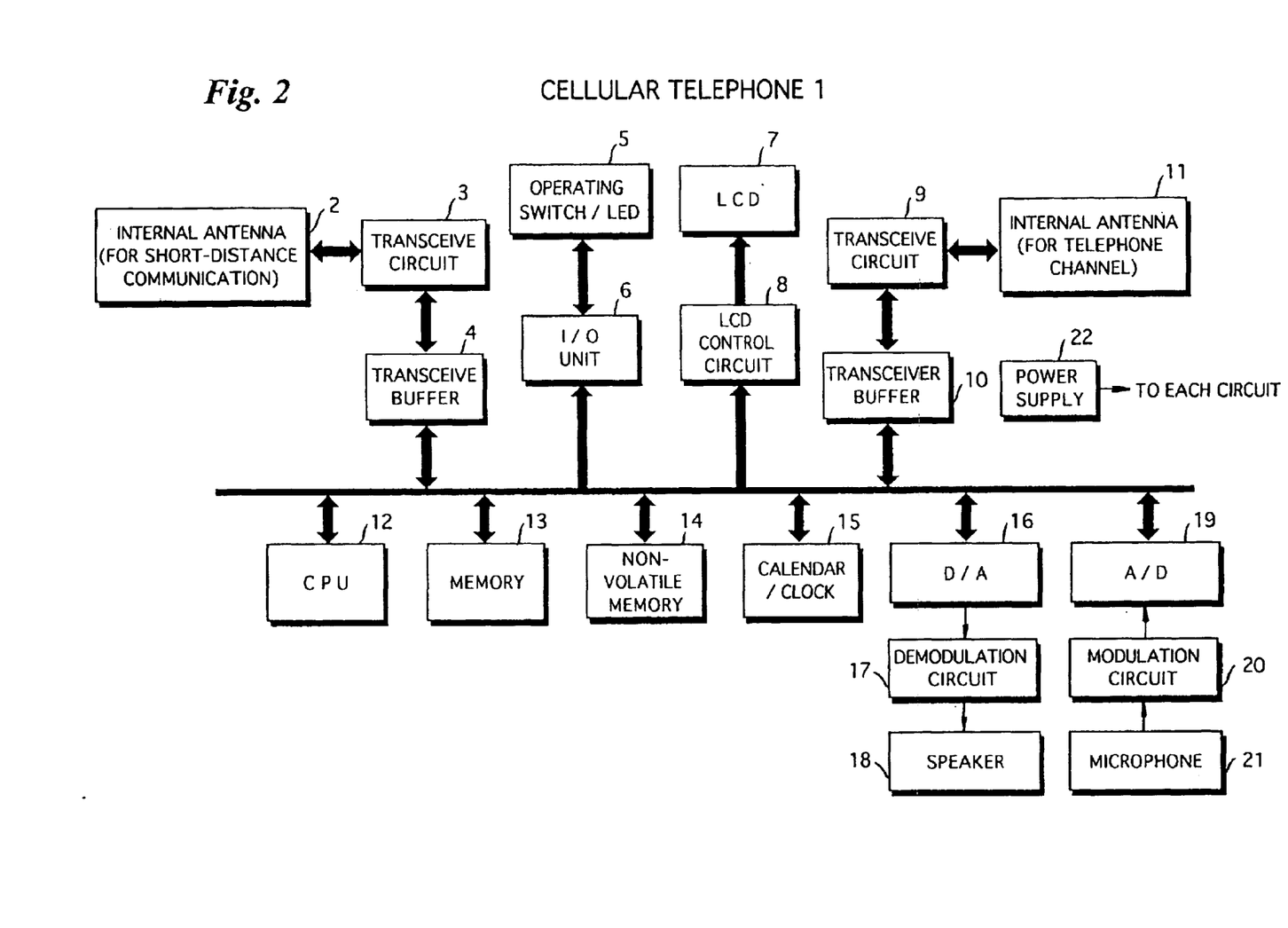
FIG. 2 is a block diagram illustrating the electrical structure of a cellular telephone.

FIG. 2 is a block diagram illustrating the electrical structure of the cellular telephone 1.

The overall operation of the cellular telephone 1 is controlled by the CPU 12.

The cellular telephone 1 includes a memory 13 for storing data temporarily, a non-volatile memory 14 in which an operating program and other data have been stored, and a calendar/clock 15. The cellular telephone 1 further includes an operating switch/LED (light-emitting diode) 5 having a numeric keypad and an ENTER button, etc. Operating signals from the operating switch/LED 5 enter the CPU 12 via an input/output (I/O) unit 6. Further, a display control signal output from the CPU 12 is applied to the operating switch/LED 5 via the I/O unit 6, whereby the light emission from the LED is controlled. The cellular telephone 1 is provided with a liquid crystal display unit 7. The latter is controlled by an LCD control circuit 8. The cellular telephone 1 is further provided with a power supply circuit 22, whence power is supplied to each of the circuits constituting the cellular telephone 1.

The cellular telephone 1 includes an internal antenna 2 for short-distance communication. Short-distance communication with the printing terminal 30 can be achieved using the internal antenna 2. Data transmitted from the printing terminal 30 by short-distance communication is received by a transceive circuit 3 via the internal antenna 2. The received data is stored temporarily in a transceive buffer 4. The received data is read out of the transceive buffer 4 and input to the CPU 12. Operation is controlled by the CPU 12 in accordance with the content of the received data.

As mentioned above, data can also be transmitted from the cellular telephone 1 to the printing terminal 30 using short-distance communication. In this case, data to be transmitted to the printing terminal 30 is applied to the transceive buffer 4. The data is read out of the transceive buffer 4 and transmitted from the internal antenna 2 for short-distance communication to the printing terminal 30 by the transceive circuit 3.

The cellular telephone 1 can also be used for conversion via a telephone channel. Voice data obtained from the telephone channel is received by a transceive circuit 9 via an internal antenna 11 for the telephone channel. The received voice data is applied to a digital/analog conversion circuit 16 via a transceiver buffer 10, whereby the digital data is converted to an analog voice signal. The latter is demodulated by a demodulation circuit 17. The demodulated analog voice signal is applied to a speaker 18, from which voice is output.

Voice applied to a microphone 21 is converted to an analog voice signal by the microphone 21. The analog voice signal is modulated by a modulation circuit 20 and then applied to an analog/digital conversion circuit 19. The analog voice signal is converted to digital voice data by the analog/digital conversion circuit 19. The digital voice data is applied to the transceive circuit 9 via the transceiver buffer 10 and is transmitted to the telephone of the communicating party by the internal antenna 11 for the telephone channel.

The cellular telephone 1 is also capable of downloading data transmitted from the Web server 50. The data transmitted from the Web server 50 is received by the transceive circuit 9 via the internal antenna 11 for the telephone channel and is stored temporarily in the transceiver buffer 10. If the data transmitted from the Web server 50 is displayable data, then the received data is applied to the LCD control circuit 8 from the transceiver buffer 10. The content represented by the received data is displayed on the display screen of the liquid crystal display unit 7.

Further, the data that has been received is applied to the transceive circuit 3 via the transceive buffer 4, whereby the data can also be transmitted to the printing terminal 30 from the internal antenna 2 for short-distance communication.

Figure 3:
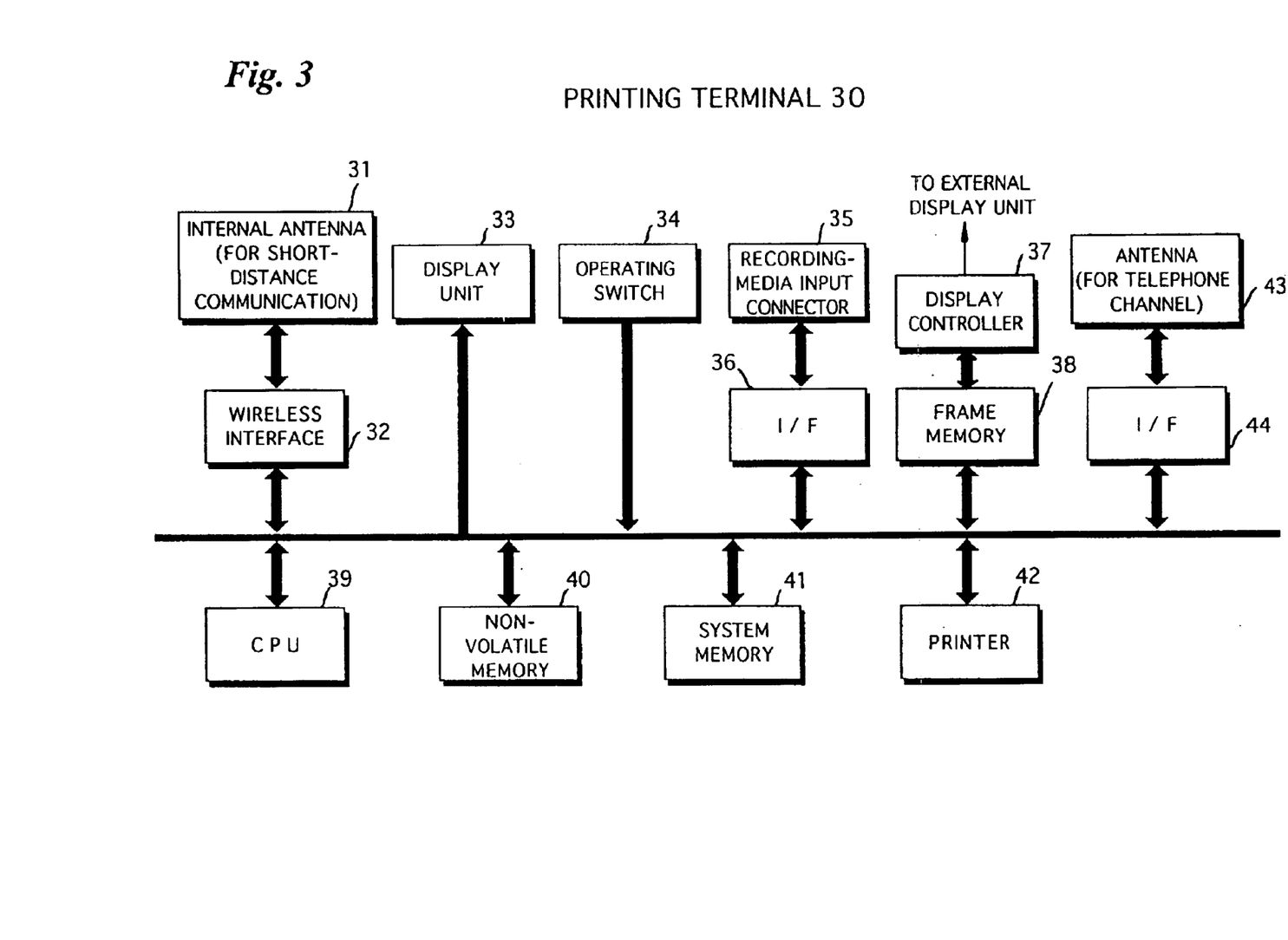
FIG. 3 is a block diagram illustrating the electrical structure of a printing terminal.

FIG. 3 is a block diagram illustrating the electrical structure of the printing terminal 30.

The overall operation of the printing terminal 30 is controlled by a CPU 39.

The printing terminal 30 includes a non-volatile memory 40 for storing data representing the type of a printer 42, another control program for controlling the printer 42, and other prescribed data, and a system memory 41 for storing an operating program and other data.

The printing terminal 30 is provided with an operating switch 34 for applying various operating commands. Signals indicating commands from the operating switch 34 are input to the CPU 39. The printing terminal 30 is further provided with a recording-media input connector 35. If a recording medium such as a memory card is connected to the recording-media input connector 35, data that has been recorded on the recording medium is input to the printing terminal 30 via an interface (I/F) 36.

When data is transmitted from the cellular telephone 1, the data is input to the printing terminal 30 by a wireless interface 32 via an internal antenna 31 for short-distance communication. If the input data is image data, the data is applied to a display unit 33, whereby the image represented by the input image data is displayed. The printing terminal 30 can also deliver an external output. If the input data is image data, the data is applied to a display controller 37 via a frame memory 38. By applying the image data to an external display unit, the image represented by the input image data is displayed on the display screen of the external display unit.

The printing terminal 30 is further provided with a telephone-channel antenna 43 for communication via the Internet. Data that has been transmitted from the Web server 50 via the Internet is input to the printing terminal 30 via the antenna 43 and an interface 44. If the data received by the antenna 43 is image data, then the image data is applied to the printer 42 to be printed thereby.

Figure 4:
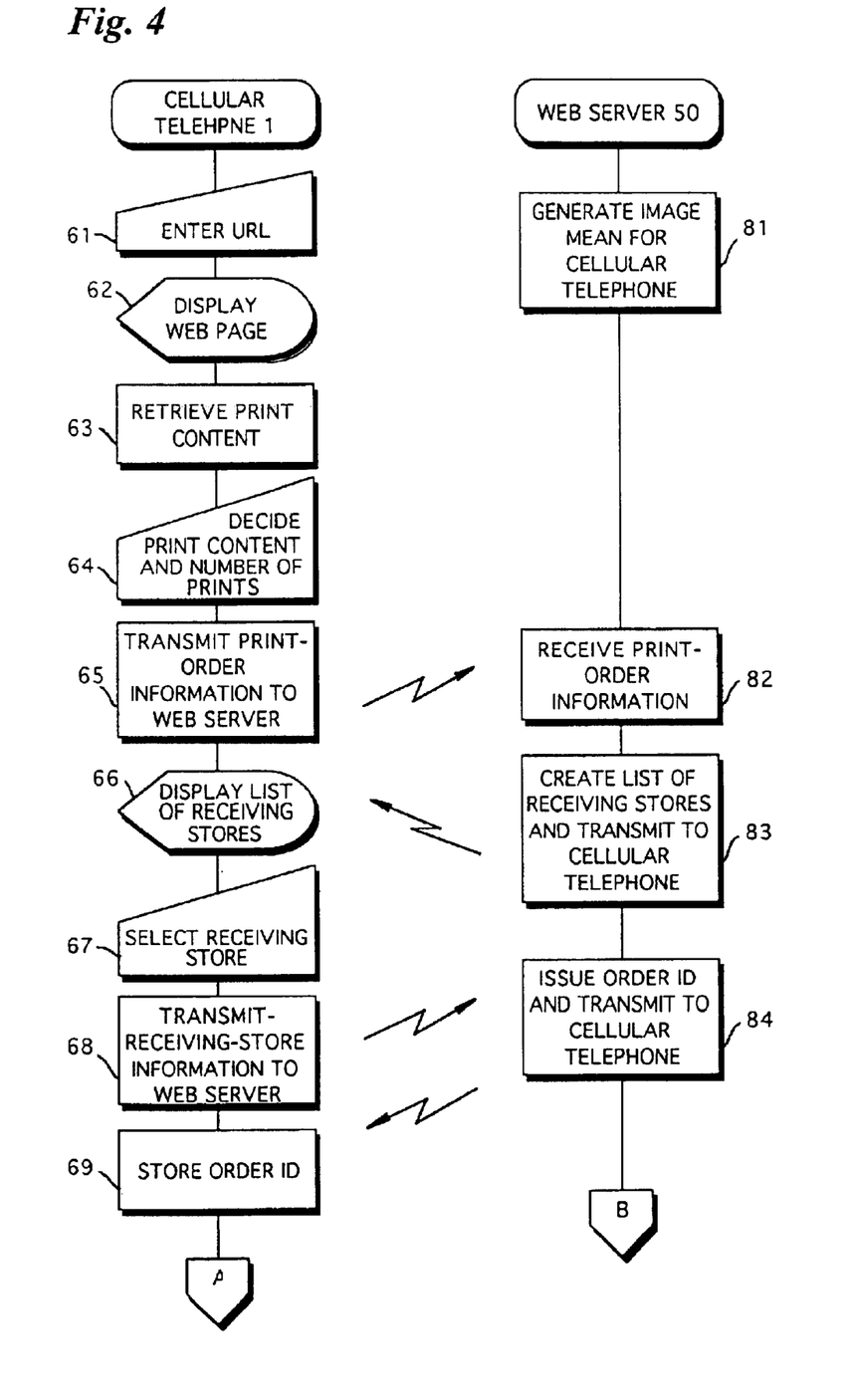
FIGS. 4 to 6 are flowcharts illustrating processing executed by the printing system.
Figure 5:
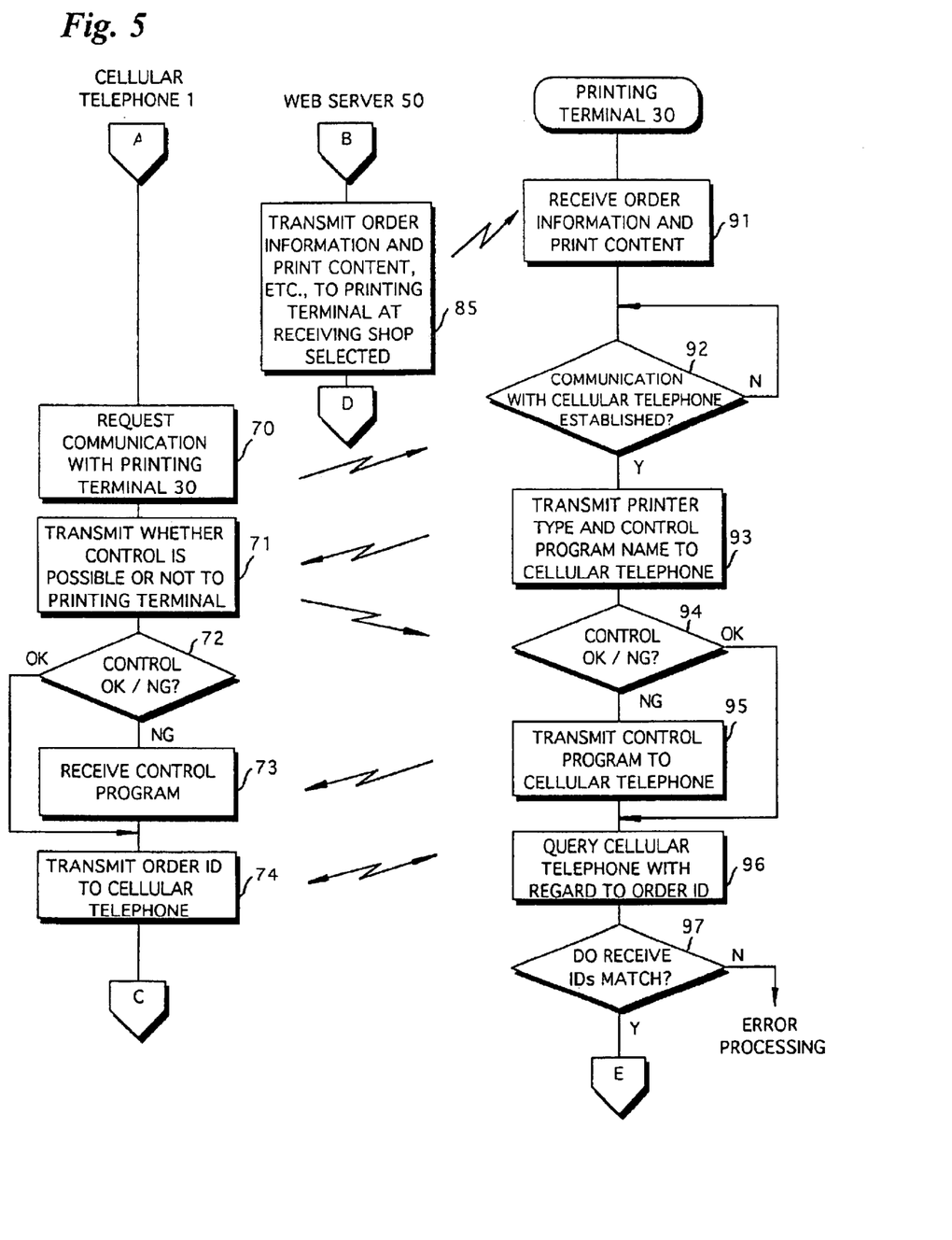
Figure 6:
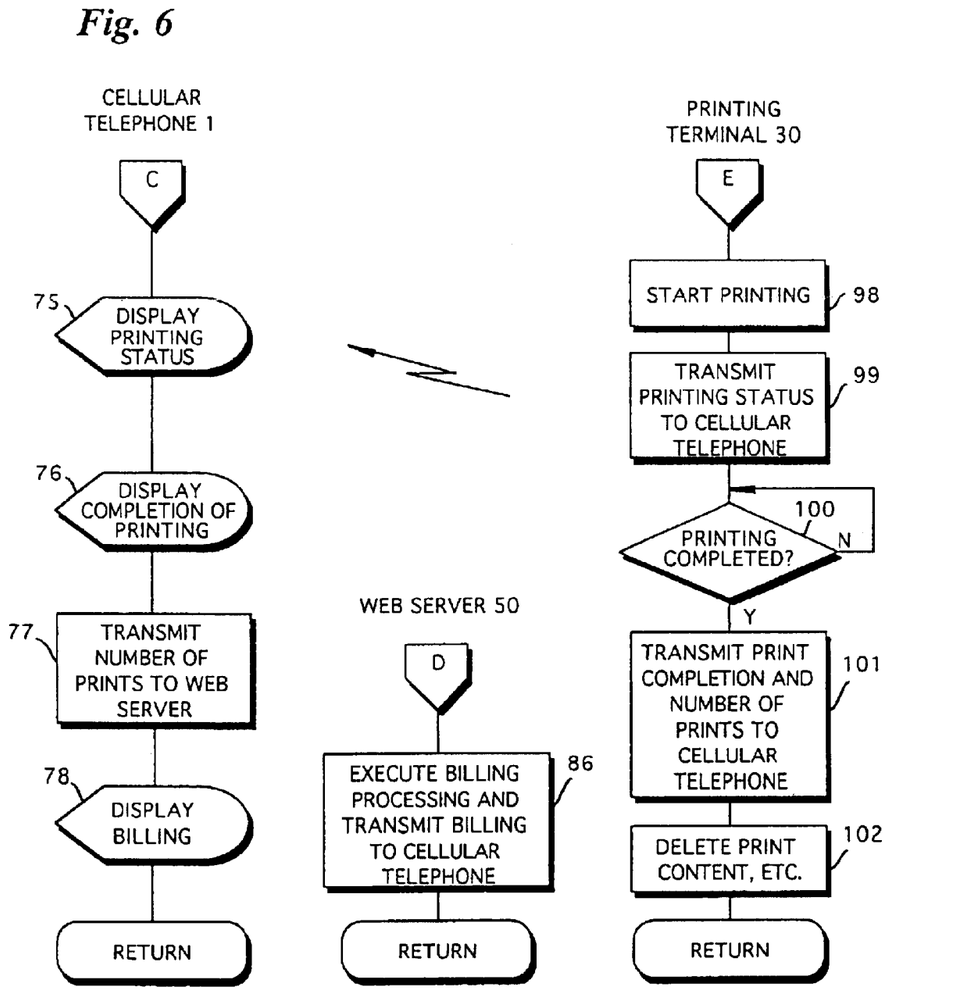

FIGS. 4 to 6 are flowcharts illustrating processing executed by the Web server 50, cellular telephone 1 and printing terminal 30.

The first step (step 61) is to enter a URL (Uniform Resource Locator) using the operating switch/LED 5.

A connection is established between the cellular telephone 1 and the Web server 50, whereupon the Web server 50 generates an image meant for a cellular telephone (step 81). Of course, the image intended for the cellular telephone may be generated in advance. The Web server 50 sends the cellular telephone 1 an HTML (HyperText Markup Language) document, which is for presenting a Web-page display, and the image data.

Upon receiving the HTML document for the Web-page display and the image data, the cellular telephone 1 displays a Web page on the display screen of the liquid crystal display unit 7 (step 62). When the Web page is displayed, a search for a Web page that includes print content (digital content) to be printed is conducted (step 63). For example, Web pages searched include images that have been uploaded to the Web server 50, e.g., the image of the individual, images of celebrities, map images, images of train and bus schedules, images of shopping district information, and images of certificates indicating that on-line games have been won.

Figure 7:
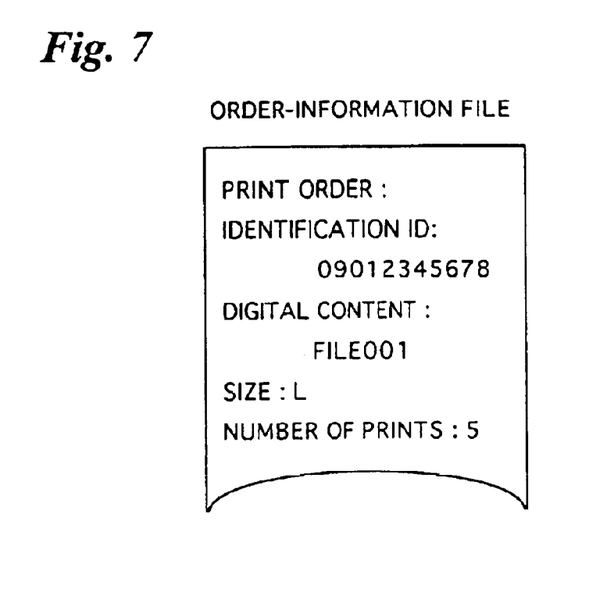
FIG. 7 is a diagram illustrating the content of a order information file.

If digital content has been decided by the search, the number of prints desired and the desired print size are entered using the operating switch/LED 5 (step 64). Data specifying the print content, data indicating the number of prints, the print size and the identification (ID) of the cellular telephone 1 are transmitted from the cellular telephone 1 to the Web server 50 as a print-order information file (see FIG. 7) (step 65).

Upon receiving the order-information file transmitted from the cellular telephone 1 (step 82), the Web server 50 creates list information indicating stores at which printouts can be received (namely stores at which the printing terminal 30 has been installed) and transmits the created list information to the cellular telephone 1 (step 83).

When the list information sent from the Web server 50 indicating the shops at which printouts can be received is received by the cellular telephone 1, the list of stores represented by this list information is displayed on the display screen of the display unit 7 of cellular telephone 1 (step 66).

Figure 8:
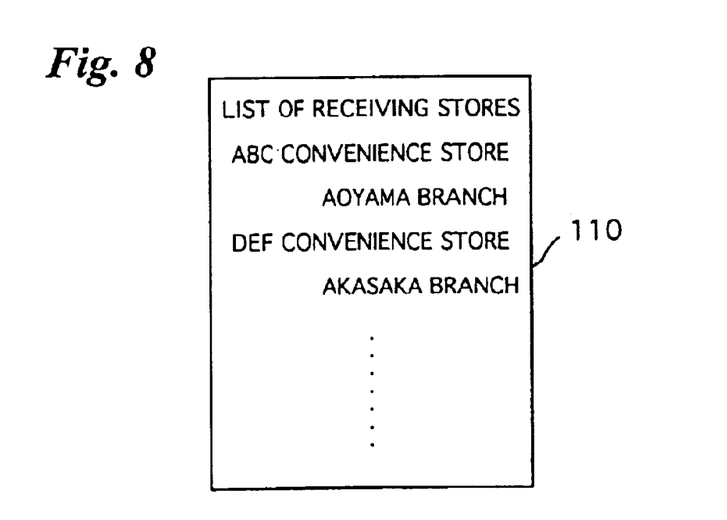
FIGS. 8 and 9 show examples of images of lists of print receiving stores displayed on a cellular telephone.

FIG. 8 illustrates an example of stores, which are capable of receiving printouts, displayed on a display screen 110 of the liquid crystal display unit 7 of cellular telephone 1.

From the list of stores being displayed on the display screen 110, the user selects a store near a location where the user is headed (step 67). Of course, the user may select a location near his or her present location. Data indicating the selected receiving store is associated with, e.g., the telephone number and identification (ID) of the cellular telephone 1, and is transmitted from the cellular telephone 1 to the Web server 50 (step 68).

In a case where the cellular telephone 1 has a GPS (Global Positioning System) function, an arrangement may be adopted in which data indicating the position of the cellular telephone 1 (the present position of the user) is transmitted to the Web server 50. The latter would create store information, which indicates stores at which printouts can be received near the present location of the user, and transmit this information to the cellular telephone 1. It may be so arranged that a location to which the user often goes (the user's residence, for example) is registered in advance and the names of stores near this location are created as the store information.

Upon receiving the data indicating receiving-store information selected by the user, the Web server 50 issues an order ID (step 84). Data indicating the issued order ID (e.g., "OOA001") is transmitted from the Web server 50 to the cellular telephone 1 (step 84).

When the cellular telephone 1 receives the data indicating the order ID transmitted from the Web server 50, the data indicating the order ID is stored in the cellular telephone 1 (step 69).

Next, the order-information file whose order ID has been stored and the print content are transmitted from the Web server 50 to the printing terminal 30 (step 85).

The order-information file and print content transmitted from the Web server 50 are received by the printing terminal 30 (step 91).

The user later goes to the receiving store that he or she has designated. Using the cellular telephone 1, the user issues a request for short-distance communication with the printing terminal 30 that has been installed at the designated receiving store (step 70).

When short-distance communication has been established between the cellular telephone 1 and printing terminal 30 ("YES" at step 92), data representing the type of printer 42 and the name of the program for controlling the printer 42 is transmitted from the printing terminal 30 to the cellular telephone 1 using short-distance communication (step 93).

Data representing the printer type and the name of the control program transmitted from the printing terminal 30 is received by the cellular telephone 1, whereupon it is determined whether printing by the printing terminal 30 can be controlled by the cellular telephone 1. If a control program conforming to the printer type has been stored in the cellular telephone 1, it is determined that the printing terminal 30 can be controlled; if such a program has not been stored in the cellular telephone 1, then it is determined that the printing terminal 30 cannot be controlled by the cellular telephone 1. As a result of this determination, data indicating whether printing by the printing terminal 30 is controllable or not is transmitted from the cellular telephone 1 to the printing terminal 30 (step 71).

If printing by the printing terminal 30 cannot be controlled using the cellular telephone 1 ("NG" at step 72), then an image requesting download of the control program is displayed on the display screen of the display unit 7 of cellular telephone 1. When a command for downloading the control program from the printing terminal 30 is applied to the cellular telephone 1, a command for transmitting the control program is transmitted to the printing terminal 30.

When the control-program transmit command from the cellular telephone 1 is received by the printing terminal 30 ("NG" at step 94), the control program is read out of the non-volatile memory 40 of printing terminal 30 and is transmitted to the cellular telephone 1 (step 95).

The cellular telephone 1 receives the control program transmitted from the printing terminal 30 (step 73). An image indicating end of download is displayed on the display unit 7 of cellular telephone 1 in response to end of reception.

The printing terminal 30 then queries the cellular telephone 1 with regard to the order ID in order to determine whether the user that ordered printing is an authorized user (step 96).

The cellular telephone 1 transmits the order ID to the printing terminal 30 in response to the query from the printing terminal 30 (step 74).

If the order ID transmitted from the cellular telephone 1 and the order ID transmitted from the Web server 50 match ("YES" at step 97), then the printing terminal 30 judges that the user of the communicating cellular telephone 1 is an authorized user who has ordered printing.

The subject matter (image, text, etc.) represented by the received print content is printed by the printer 42 of printing terminal 30 at the size and in a number of prints specified by the print-order information (step 98). Data representing the printing status (e.g., the page number currently being printed) of the printing terminal 30 is transmitted from the printing terminal 30 to the cellular telephone 1 (step 99).

Upon receiving the print-status information, the cellular telephone 1 displays a print-status image on the display unit of the cellular telephone 1 (step 75).

When printing by the printing terminal 30 ends ("YES" at step 100), data indicating end of printing and data representing the number of pages printed normally is transmitted to the cellular telephone 1 (step 101). Further, the print content is deleted from the printing terminal 30 (step 102).

When the data indicating end of printing and the data representing the number of pages printed normally is received by the cellular telephone 1, an image indicating the end of printing is displayed on the display screen 110 (step 76). The cellular telephone 1 then generates data representing the number of pages printed normally and transmits this data to the Web server 50 (step 77).

Upon receiving the data, representing the number of pages printed normally transmitted from the cellular telephone 1, the Web server 50 executes billing processing in accordance with the number of prints and transmits the result of billing to the cellular telephone 1 (step 86).

The billing information transmitted from the Web server 50 is received by the cellular telephone 1 and the result of billing is displayed on the display screen 110 thereof (step 78).

In the embodiment described above, the user of the cellular telephone 1 designates a specific store at which a printout is to be received. However, an arrangement may be adopted in which a plurality of shops or chain stores (e.g., any convenience store or any station, etc.) is designated rather than a specific store. This is useful when it is not known where the printing terminal 30 is located.

Figure 9:
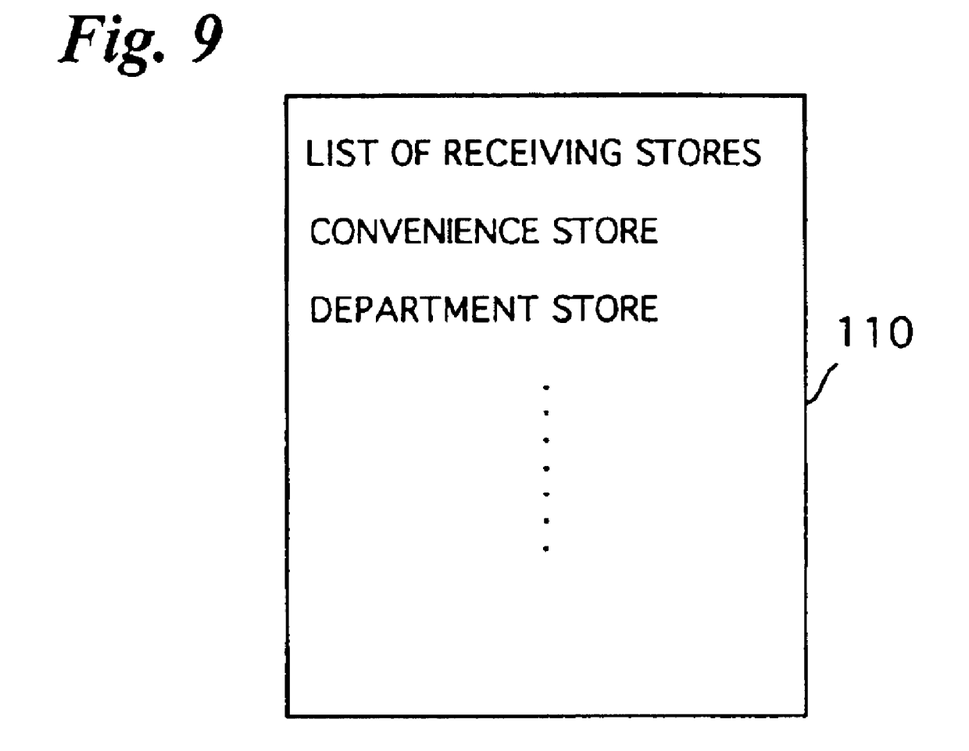

FIG. 9 illustrates an example of an image showing a list of receiving stores displayed on the display screen of the display unit 7 of cellular telephone 1.

As mentioned above, when receiving-store list information is transmitted from the Web server 50 to the cellular telephone 1, the image of this list of receiving stores is displayed on the display screen 110 of the display unit 7 of cellular telephone 1.

Convenience store, department store, etc., are simply displayed on the image of the list of receiving stores. In a case where the user will not pick up a printout at a specific convenience store and a convenience store anywhere will suffice, the user merely designates "convenience store" as the receiving store. In other cases, e.g., when a department store at any location will suffice, the user merely designates "department store". Of course, it goes without saying that convenience stores or department stores, etc., of a specific company can be designated.

Figure 10:
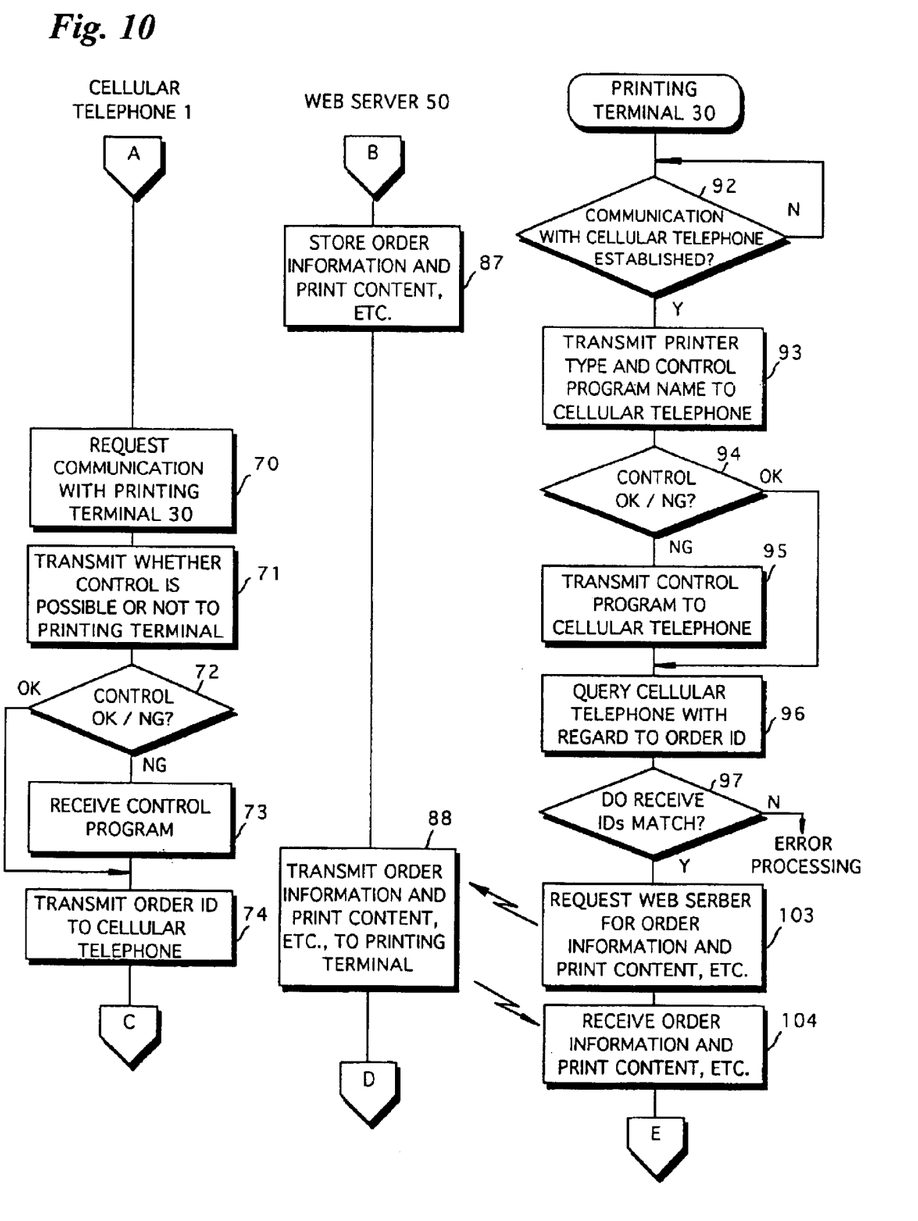
FIG. 10 is a flowchart illustrating part of processing executed by the printing system according to another embodiment of the invention.

FIG. 10 is a flowchart illustrating part of the processing executed by the cellular telephone 1, Web server 50 and printing terminal 30 in a case where a specific store is not designated as the printout receiving store. FIG. 10 corresponds to FIG. 5, and processing steps in FIG. 10 identical with those of FIG. 5 are designated by like step numbers and need not be described again.

Order information and print content, etc., that have been transmitted from the cellular telephone 1 to the Web server 50 are not transmitted from the Web server 50 to the printing terminal 30 immediately after issuance of the order ID but are stored temporarily in the Web server 50 (step 87).

For example, if "convenience store" has been designated as the print receiving store, the user goes to any convenience store among those designated and, using the cellular telephone 1, communicates, by way of the short-distance communication function, with the printing terminal 30 installed at this convenience store. When short-distance communication is established and the order ID is verified, the printing terminal 30 requests the Web server 50 for the order information and print content, etc. (step 103).

In response to the request from the printing terminal 30, the Web server 50 transmits the order information and print content to the printing terminal 30 (step 88).

The printing terminal 30 receives the order information and print content transmitted from the Web server 50 (step 104). The printing terminal 30 then prints the subject matter represented by the print content that was designated by the user. The printing is performed in a manner similar to that of the above-described embodiment.

The user of the cellular telephone 1 may be registered as a member of a certain specific site. If in such case it becomes possible for digital content desired by the user to be printed out, the site communicates with the cellular telephone using electronic mail. The address (URL) at which the digital content resides is included as the subject matter of the communication. The user of the cellular telephone clicks the URL contained in the body of the electronic mail, whereby the user can perform the content selection operation in the manner described above.

By virtue of this arrangement, the user, without performing the laborious task of searching and retrieving digital content, can ascertain when digital content of a field of interest is capable of being printed out and can designate printing immediately on the spot.

As many apparently widely different embodiments of the present invention can be made without departing from the spirit and scope thereof, it is to be understood that the invention is not limited to the specific embodiments thereof except as defined in the appended claims.

What is claimed is:

1. A printing system comprising:

a Web server storing digital content, a portable electronic device and a printing terminal in communication with one another, wherein said portable electronic device includes:

a designating device for designating the number of prints and digital content, which has subject matter desired to be printed, from among the digital content that has been stored in said Web server;

an input device for inputting information relating to a receiving location where a printout of the subject matter will be received; and a first transmitting device for transmitting an order-information file including data representing the number of prints and digital-content identification data, which identifies the digital content that has been designated by said designating device, and the information relating to the receiving location input from said input device, directly to said Web server in a form associated with each other;

said Web server includes:

a retrieval device for retrieving digital content, which has the subject matter desired to be printed, from the digital content that has been stored in said Web server, based upon the identification data transmitted from said first transmitting device of said portable electronic device; and a second transmitting device for transmitting the order-information file and digital content, which has been retrieved by said retrieval device, to said printing terminal placed at a location specified by the information relating to the receiving location transmitted from said first transmitting device of the portable electronic device; and said printing terminal has a printer for printing subject matter represented by digital content that has been transmitted from said second transmitting device of said Web server, the number of prints represented by data of the number of prints.

2. The system according to claim 1, wherein said Web server further includes:

a generating device for generating an order ID in response to receipt of the digital-content identification data and information relating to the receiving location transmitted from said first transmitting unit of said portable electronic device; and a third transmitting device for transmitting the order ID, which has been generated by said generating device, to said portable electronic device and said printing terminal;

said Web server transmitting digital content, which has been retrieved by said retrieval device, and identification data identifying said portable electronic device, which has been transmitted from said first transmitting device of said portable electronic device, to said printing terminal in a form associated with each other, said printing terminal being placed at a location specified by information relating to the receiving location;

said portable electronic device further includes a fourth transmitting device for transmitting the order ID, which has been transmitted from said third transmitting device of said Web server, to said printing terminal; and said printing terminal further includes:
a determination device for determining whether the order ID transmitted from said third transmitting device of said Web server and the order ID transmitted from said fourth transmitting device of said portable electronic device match; and
a device for controlling said printer so as to execute printing in accordance with a determination by said determination unit to the effect that the order IDs match.

3. The system according to claim 1, wherein the information relating to receiving location entered from said input device of said portable electronic device indicates a receiving location that is uniquely decided.

4. The system according to claim 1, wherein the information relating to receiving location entered from said input device of said portable electronic device indicates a plurality of receiving locations;
said Web server further includes:
a generating device for generating an order ID in response to receipt of the digital-content identification data and information relating to the receiving location transmitted from said first transmitting device of said portable electronic device; and
a fifth transmitting device for transmitting the order ID, which has been generated by said generating device, to said portable electronic device and said printing terminal;
said portable electronic device further includes a sixth transmitting device for transmitting the order ID, which has been transmitted from said fifth transmitting device of said Web server, to said printing terminal;
said printing terminal further includes a determination device for determining whether the order ID transmitted from said sixth transmitting device of said portable electronic device and the order ID transmitted from said fifth transmitting unit of said Web server match; and
said second transmitting device of said Web server transmits the digital content to said printing terminal in accordance with a determination by said determination device to the effect that the order IDs match.

5. A portable electronic device comprising:
a designating device for designating the number of prints and digital content, which has subject matter desired to be printed, from among digital content that has been stored in a Web server;
an input device for inputting information relating to a receiving location where a printout of the subject matter will be received; and
a transmitting device for transmitting an order-information file including data representing the number of prints and digital-content identification data, which identifies the digital content that has been designated by said designating device, and the information relating to the receiving location input from said input device, directly to said Web server in a form associated with each other.

6. A Web server comprising:
a retrieval device for retrieving digital content, which has subject matter desired to be printed, from digital content that has been stored in the Web server, based upon identification data, which is included an order-information file, identifying the digital content, which has the subject matter desired to be printed, from among digital content that has been stored in the Web server, the identification data being directly transmitted from a portable electronic device; and
a transmitting device for transmitting the order-information file and digital content that has been retrieved by said retrieval device to a printing terminal placed at a location specified by information relating to a location for receiving a printout of the subject matter transmitted from said portable electronic device.

7. A method of controlling operation of a portable electronic device, comprising the steps of:
designating the number of prints and digital content, which has subject matter desired to be printed, from among digital content that has been stored in a Web server;
inputting information relating to a receiving location where a printout of the subject matter will be received; and
transmitting an order-information file including data representing the number of prints and identification data, which identifies the digital content that has been designated, and information relating to the receiving location that has been input, directly to the Web server in a form associated with each other.

8. A method of controlling operation of a Web server, comprising the steps of:
retrieving digital content, which has subject matter desired to be printed, from digital content that has been stored in the Web server, based upon identification data, which is included an order-information file, identifying the digital content, which has the subject matter desired to be printed, from among digital content that has been stored in the Web server, the identification data being transmitted from a portable electronic device; and
transmitting the order-information file and digital content that has been retrieved to a printing terminal placed at a location specified by information relating to a location for receiving a printout of the subject matter directly transmitted from the portable electronic device.

9. A remote printing system, comprising a portable electronic device, a web server, and a printing terminal all configured to communicate with each other, wherein:
the portable electronic device is configured to transmit an order information file directly to the web server, wherein the order information file includes information regarding data content to be printed and a location information of the printing terminal;
the web server is configured to transmit the data content to the printing terminal based on the location information in the order information file; and
the printing terminal is configured to print the data content received from the web server.

10. The system of claim 9, wherein:
the portable electronic device is configured to download the data content from the web server and transmit the data content to the printing terminal; and
the printing terminal is configured to print the data content received from the portable electronic device.

11. The system of claim 9, wherein:

the portable electronic device is configured to query the web server for a list of one or more available printing terminals; and the web server is configured to respond to the query by generating the list of the one or more available printing terminals.

12. The system of claim 11, wherein the web server generates the list of the one or more available printing terminals based on at least one of a present position of the portable electronic device and a predetermined registration of a user.

13. The system of claim 12, wherein the portable electronic device is configured to transmit the present position of the portable electronic device to the web server.

14. The system of claim 12, wherein the portable electronic device and the printing terminal are configured to communicate with each other using short-distance wireless communication protocols.

15. The system of claim 14, wherein the portable electronic device and the printing terminal need not be in direct line of sight with each other.

16. The system of claim 14, wherein the portable electronic device is configured to control printing operations of the printing terminal.

17. The system of claim 16, wherein:

the portable electronic device is configured to request a print control program from the printing terminal upon determining that the portable electronic device does not currently have the capability to control the printing operations of the printing terminal; and the printing terminal is configured to transmit the print control program upon receiving the request.

18. The system of claim 9, wherein the printing terminal is configured to verify a user's authorization.

19. The system of claim 18, wherein:

the web server is configured to generate the user's authorization by generating an order ID;

the portable electronic device is configured to transmit the order ID to the printing terminal; and the printing terminal is configured to verify the order ID.

20. A portable electronic device for use in remote printing, comprising:

a designating device configured to designate data content to be printed;

a destination specifying device configured to specify a destination for the data content; and a transmitting device configured to transmit an order information file directly to a web server, wherein the order information file includes the data content designation and the destination.

21. The portable electronic device of claim 20, wherein the transmitting device is a first transmitting device, the portable electronic device further comprising:

a download device configured to download the data content from the web server; and a second transmitting device configured to transmit the downloaded data content to a printing terminal.

22. The portable electronic device of claim 20, further comprising a query device configured to query the web server for a list of available one or more printing terminals based on at least one of a present position of the portable electronic device and a predetermined registration of a user.

23. The portable electronic device of claim 20, further comprising a printing control device configured to control printing operations of a printing terminal.

24. The portable electronic device of claim 23, wherein the printing control device is configured to download a print control program from the printing terminal.

25. A web server for use in remote printing, comprising:

an order information receiving device configured to receive an order information directly from a portable electronic device, wherein the order information includes a data content designation and a destination information;

a data retrieval device configured to retrieve the data content; and a transmitting device configured to transmit the data content to a location specified in the destination information.

26. The web server of claim 25, further comprising a location retrieval device configured to retrieve a list of one or more available printing terminals based on at least one of a present position of the portable electronic device and a predetermined registeration of a user upon request from the portable electronic device, and wherein the transmitting device is configured to transmit the list of the one or more available printing terminals.

27. A method for operating a portable electronic device for use in remote printing, comprising:

designating data content to be printed;

specifying a destination for the data content; and transmitting an order information file directly to a web server, wherein the order information file includes the data content designation and the destination.

28. The method of claim 27, further comprising:

downloading the data content from the web server; and transmitting the downloaded data content to a printing terminal.

29. The method of claim 27, further comprising querying the web server for a list of available one or more printing terminals based on at least one of a present position of the portable electronic device and a predetermined registeration of a user.

30. The method of claim 27, further comprising controlling printing operations of a printing terminal.

31. The method of claim 30, further comprising downloading a print control program from the printing terminal.

32. A method for operating a web server for use in remote printing, comprising:

receiving an order information directly from a portable electronic device, wherein the order information includes a data content designation and a destination information;

retrieving the data content; and transmitting the data content to a location specified in the destination information.

33. The method of claim 32, further comprising:

retrieving a list of one or more available printing terminals based on at least one of a present position of the portable electronic device and a predetermined registeration of a user upon receiving a request from the portable electronic device; and transmitting the list of the one or more available printing terminals to the portable electronic device.

* * * * *